(12) United States Patent
Hering et al.

(10) Patent No.: US 9,206,849 B2
(45) Date of Patent: Dec. 8, 2015

(54) SEALING ELEMENT FOR A BEARING, IN PARTICULAR A ROLLING CONTACT BEARING

(75) Inventors: Joachim Hering, Wuerzburg (DE); Michael Pausch, Oberwerrn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 394 days.

(21) Appl. No.: 12/670,904

(22) PCT Filed: Jul. 24, 2008

(86) PCT No.: PCT/DE2008/001232
§ 371 (c)(1),
(2), (4) Date: Jul. 30, 2010

(87) PCT Pub. No.: WO2009/015648
PCT Pub. Date: Feb. 5, 2009

(65) Prior Publication Data
US 2010/0283208 A1    Nov. 11, 2010

(30) Foreign Application Priority Data

Jul. 28, 2007 (DE) .......................... 10 2007 035 550

(51) Int. Cl.
| F16C 32/00 | (2006.01) |
| F16C 33/78 | (2006.01) |
| F16C 41/00 | (2006.01) |
| F16J 15/32 | (2006.01) |

(52) U.S. Cl.
CPC ........... *F16C 33/7843* (2013.01); *F16C 41/008* (2013.01); *F16J 15/3296* (2013.01)

(58) Field of Classification Search
CPC ..... F16J 15/32; F16J 15/3248; F16J 15/3252; F16J 15/3296; F16C 41/008; F16C 33/7843
USPC ..................... 277/317, 402, 571; 324/207.25; 384/448
See application file for complete search history.

(56) References Cited

U.S. PATENT DOCUMENTS

| 4,663,565 | A | * | 5/1987 | Novajovsky ............... 315/39.51 |
| 5,969,518 | A | | 10/1999 | Merklein et al. |
| 5,980,115 | A | * | 11/1999 | Hoeting ......................... 384/478 |
| 7,158,034 | B2 | * | 1/2007 | Corbett, Jr. ................. 340/572.1 |
| 7,471,198 | B2 | | 12/2008 | Yamamoto et al. |
| 7,971,792 | B2 | | 7/2011 | Seriu et al. |
| 2002/0186134 | A1 | * | 12/2002 | Rehfus et al. .............. 340/572.8 |
| 2004/0062459 | A1 | | 4/2004 | Bochet |
| 2005/0226545 | A1 | | 10/2005 | Ohtsuki et al. |

FOREIGN PATENT DOCUMENTS

| CN | 87204935 U | 4/1988 |
| DE | 196 44 744 | 5/1998 |
| DE | 601 13 188 T2 | 7/2006 |

(Continued)

*Primary Examiner* — Gilbert Lee
(74) *Attorney, Agent, or Firm* — Simpson & Simpson, PLLC (57) ABSTRACT

A sealing element for a bearing, in particular a rolling contact bearing, and to a bearing, in particular a rolling contact bearing. The sealing element has a sealing composed of an elastic material, at least one support element composed of a rigid material, an IC identification, and an antenna for the IC identification. The at least one support element is formed from a non-metallic material such that the sealing element remains sufficiently stable mechanically and the operation of the antenna suffers little interference.

18 Claims, 5 Drawing Sheets

(56) References Cited

FOREIGN PATENT DOCUMENTS

| | | |
|---|---|---|
| DE | 11 2004 002 234 T5 | 10/2006 |
| DE | 11 2004 002 235 T5 | 10/2006 |
| EP | 1 156 234 A2 | 11/2001 |
| EP | 1156234 A2 | 11/2001 |
| FR | 2 886 361 | 12/2006 |
| JP | 2003 013983 | 1/2003 |
| JP | 2005042895 A | 2/2005 |
| JP | 2005-084962 A | 3/2005 |
| JP | 2005069404 A | 3/2005 |
| JP | 2005-155735 A | 6/2005 |
| JP | 2005198168 A | 7/2005 |
| JP | 2006038151 A | 2/2006 |
| JP | 2006038189 A | 2/2006 |
| JP | 2006039902 A | 2/2006 |
| JP | 2006258242 A | 9/2006 |
| JP | 2006 275884 | 10/2006 |
| JP | 2006275884 A | 10/2006 |
| JP | 2007179538 A | 7/2007 |
| WO | 2006129000 A1 | 12/2006 |

* cited by examiner

Fig. 5

SEALING ELEMENT FOR A BEARING, IN PARTICULAR A ROLLING CONTACT BEARING

This application is a 371 of PCT/DE2008/001232 filed Jul. 24, 2008, which in turn claims the priority of DE 10 2007 035 550.7 filed Jul. 28, 2007, the priority of both applications is hereby claimed and both applications are incorporated by reference herein.

BACKGROUND OF THE INVENTION

The invention relates to a sealing element for a bearing, in particular for a rolling contact bearing.

For bearings, in particular rolling contact bearings, it is known to provide on the bearing, an IC identifier which stores data relating to the bearing, for example a model number. Furthermore, an antenna for the IC identifier is provided by means of which the information in the IC identifier can be read out and information can be transmitted to the IC identifier. It is also known to address the IC identifier or the antenna thereof using electromagnetic radiation in the microwave range, with the result that the term RFID (radio frequency identification) technology is used which is utilized for bearings, in particular rolling contact bearings.

US 2002/0186134 A1 describes a rolling contact bearing having an IC identifier in which an RFID element is installed in the internal ring of the rolling contact bearing. An antenna is arranged outside the rolling contact bearing. It is disadvantageous that the essentially metallic inner ring disrupts the electromagnetic field of the antenna, with the result that the field strength in the region of the RFID element is only low. As a result, it is virtually impossible to reliably read the RFID element, in particular during operation of the rolling contact bearing.

DE 11 2004 002 235 T5 describes a sealing element for a rolling contact bearing, wherein the sealing element has a sealing means composed of an elastic material and a support element composed of a rigid material. An IC identifier with an antenna is arranged on the sealing element, wherein various possible ways of forming a receptacle on the sealing means are indicated in order to be able to arrange the IC identifier. It is disadvantageous that the receptacle on the sealing means takes up a large amount of space and also that the IC identifier protrudes beyond the rolling contact bearing with the result that installation of the rolling contact becomes complicated.

DE 11 2004 002 234 T5 describes a sealing element for a rolling contact bearing, wherein the sealing element has a sealing means composed of an elastic material and a support element composed of a rigid, metallic material. An IC identifier with an antenna for the IC identifier is arranged on the sealing element, wherein in a first exemplary embodiment the annular metallic support element is embodied as an antenna, and in a second exemplary embodiment the antenna of the metallic annular support element is attached to the support element spatially separated therefrom by means of an electric insulating part. A disadvantage in both exemplary embodiments is that the metallic support element disrupts the antenna and in an annular embodiment as an antenna is not very suitable for the IC identifier since a dipole with two ends spaced apart from one another is not formed. A metallic support element which is embodied in a discontinuous fashion would be suitable as a dipole of the antenna, but would then no longer give the sealing element the overall necessary mechanical stability. It is also disadvantageous that an additional installation space is necessary in order to accommodate the IC identifier, the antenna and/or a suitable insulation means. It is also to be considered disadvantageous that the insulation of the antenna with respect to the metallic support element is complex and unreliable, particularly when subjected to mechanical stressing because the insulation is embodied by the sealing element formed from a soft elastomer.

OBJECT OF THE INVENTION

The object of the invention is to improve the sealing element and bearing mentioned at the beginning in such a way that the sealing element remains sufficiently mechanically stable and the antenna's function is disrupted to a lesser degree.

SUMMARY OF THE INVENTION

This object is achieved, according to the invention, by a sealing element which comprises a sealing means composed of an elastic material, at least one support element composed of a rigid material, an IC identifier, and an antenna for the IC identifier. The at least one support element is formed from a non-metallic material. and by means of a bearing comprising the sealing element.

When the at least one support element is formed from a non-metallic material, losses of electromagnetic radiation can be avoided and the function of the antenna is disrupted to a lesser degree since the antenna is arranged in a dielectric, largely non-conductive environment and line losses are significantly reduced. As a result, the antenna can be made small in size and configured in a way which is adapted to the specific requirements of the IC identifier element, as a result of which a further degree of freedom in the configuration of the sealing element is obtained. The support element composed of the non-metallic material performs the function, if appropriate together with a further, for example metallic support element, of mechanically stabilizing the seal. If a metallic support element is provided in addition to the support element composed of a non-metallic material, for example of wood, ceramic, plastic or glass, the metallic support element can be embodied as a ring which is no longer provided as an antenna and can therefore be embodied in a completely circumferential, that is to say continuous fashion, which improves the stability of the seal. In this context it goes without saying that the metallic support element can be omitted entirely and that the at least one support element is formed only from ceramic or plastic.

There is preferably a provision that precisely one support element is provided and that the precisely one support element is manufactured from plastic. The single support element simplifies the design of the sealing element as well as its manufacture, which can provide that in a first step the support element is manufactured, for example molded, from a first plastic, and in a second step the sealing means is formed from an elastic plastic around the support element. Such a manufacturing method is easy to carry out with the result that sealing elements can quickly be manufactured in large numbers. It goes without saying here that both the support element and the sealing means can be manufactured from the same material, for example a plastic, wherein due to suitable post-treatment, for example by means of electromagnetic radiation, the plastic is given a different material property in the region of the support element than the plastic in the region of the sealing means.

There is preferably a provision that a material with a high dielectric constant is arranged between the antenna and an interior space of the bearing, wherein the material with the high dielectric constant decreases disruption of the function of the antenna by, for example, a metallic bearing cage. The metallic bearing cage brings about a reduction in the electrical field strength in the vicinity, and therefore in a region in which the antenna, which is arranged in the sealing element, is located. A material between the antenna and the metallic bearing cage reduces the wavelength in the material with the high dielectric constant in such a way that the field strength can reach a high value in the region of the antenna. With respect to the material with the high dielectric constant and the arrangement of the material, for example as a layer with an adjustable layer thickness, there is a degree of freedom which can be utilized with respect to achieving the highest possible field strength at the location of the antenna.

There is particularly preferably a provision that the material with the high dielectric constant is a ceramic and that this ceramic is arranged as a film on the antenna. Ceramics have in this context dielectric constants which can be adjusted well and extend over several orders of magnitude. The formation of the ceramic as a film ensures a defined layer thickness which can also easily be implemented and controlled with respect to large-scale fabrication of sealing elements.

There is preferably a provision that the antenna is arranged completely inside the at least one support element, with the result that the antenna is integrated structurally into the support element and therefore into a defined, non-conductive environment, and the external dimensions of the sealing element or of the bearing remain unchanged.

The IC identifier is preferably arranged completely inside the at least one support element, and is therefore held in an externally protected fashion.

As an alternative to an arrangement in which the antenna and/or the IC identifier are arranged in the support element it is possible to provide that the IC identifier and/or the antenna are/is attached to the support element, wherein existing sealing elements can easily be retrofitted and IC identifiers can easily be replaced. It goes without saying here that the IC identifier can be attached to the support element in such a way that it can be released from the outside, and the antenna is arranged in the support element, with the result that the IC identifier can be quickly replaced, for example, for test purposes or trial purposes.

Further advantages and features of the invention emerge from the description of exemplary embodiments and from the dependent claims.

The invention will be described and explained in more detail below with reference to the appended drawings.

DETAILED DESCRIPTION OF THE DRAWING

Figure 1:
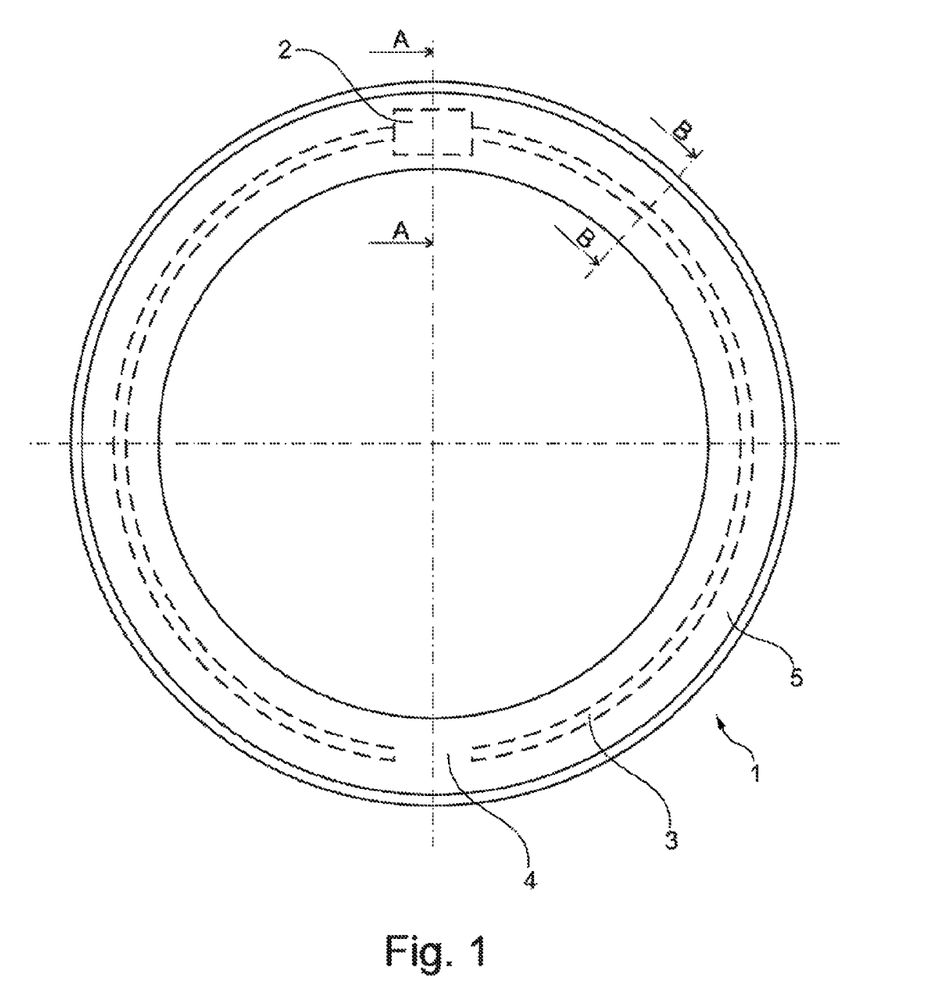
FIG. 1 shows a top view of a first exemplary embodiment of a sealing element according to the invention for a bearing according to the invention.

FIG. 1 shows an annular sealing element 1 for a rolling contact bearing (not illustrated in more detail). The sealing element 1 comprises an IC identifier 2 and an antenna 3, wherein the latter is embodied as an annular element which is discontinuous in certain sections and has a gap 4. The antenna 3 and a body 5 of the sealing element 1 are respectively configured in a concentric fashion. The antenna 3 is arranged inside the body 5 of the sealing element 1 and is therefore represented only by dashed lines in FIG. 1. The IC identifier 2 comprises a chip which can receive and store data, and it is not presented in more detail below.

Figure 2:
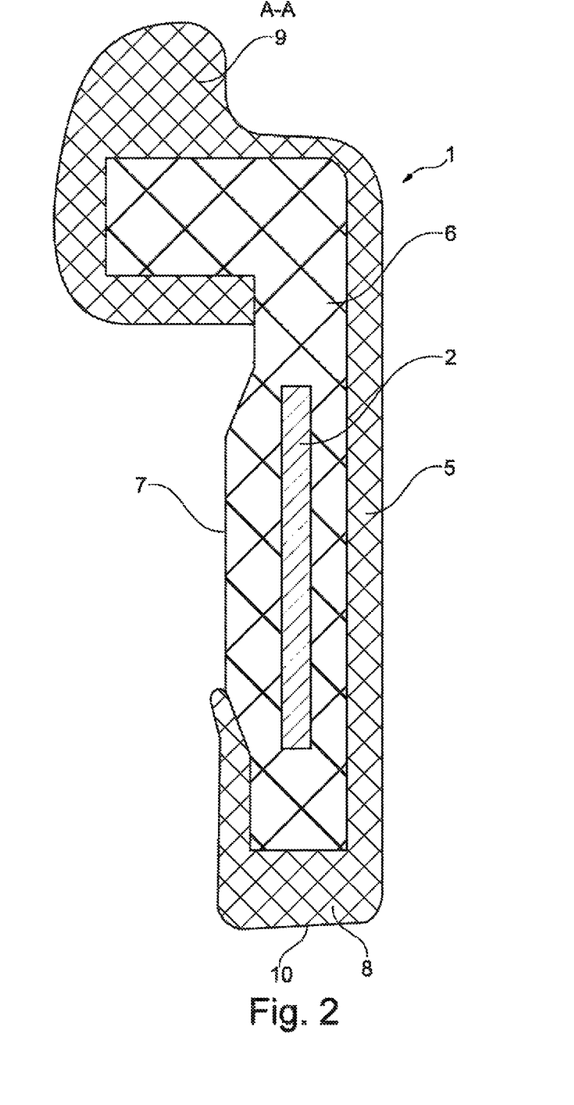
FIG. 2 shows a sectional view of the first exemplary embodiment along the line A-A from FIG. 1.

FIG. 2 shows the body 5 of the sealing element 1 which has the IC identifier 2. The IC identifier 2 is arranged inside a support element 6, wherein the support element 6 is composed of a rigid material, in the present case of a thermoplastic on the basis of polyamide. The outer surface of the support element 6 is surrounded, with the exception of a section 7, by a sealing means 8 which is composed of a soft elastomer (rubber). The sealing means 8 forms a sealing lip 9 and a sealing section 10, wherein in an installation position of the sealing element 1, the sealing lip 9 engages below an assigned receptacle, and the sealing section 10 bears against a sealing groove with an essentially complementary cross-sectional shape. Owing to the wide formation of the soft elastomer in the region of the sealing lip 9 or of the sealing section 10, said soft elastomer is pressed in there, with the result that the sealing element 1 is held clamped in.

Figure 3:
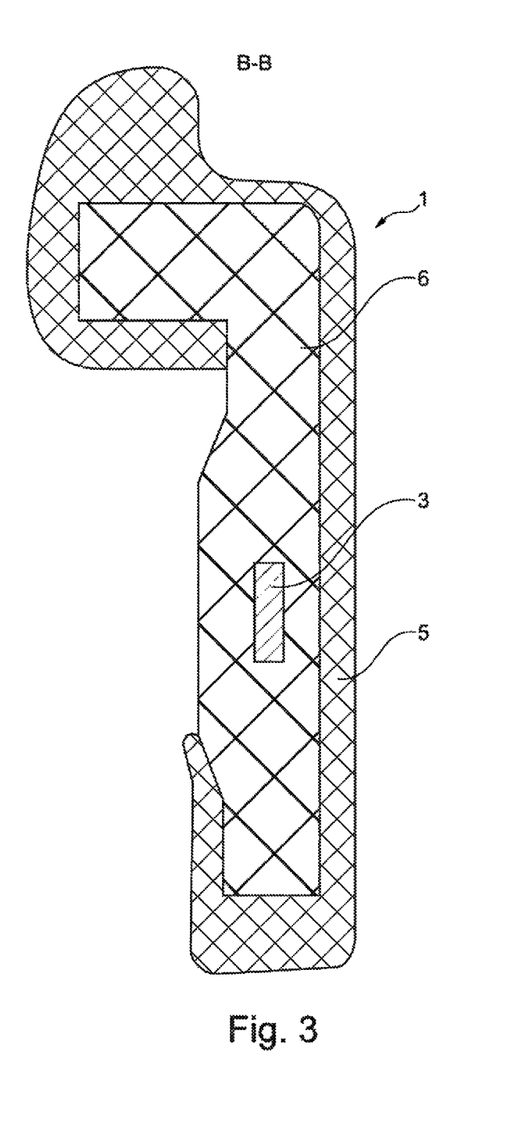
FIG. 3 shows a sectional view of the first exemplary embodiment along the line B-B from FIG. 1.

FIG. 3 shows the body 5 of the sealing element 1 with the support element 6 and the sealing means 8. In this context, the cross section of the support element 6 or of the sealing means 8 has a comparable shape in the region of the line A-A (FIG. 2) and the line B-B (FIG. 3). The antenna 3, which has an essentially rectangular cross-sectional periphery, is illustrated inside the support element 6. However, it goes without saying that other shapes, for example round shapes, may be provided for the periphery of the cross section of the antenna.

Figure 4:
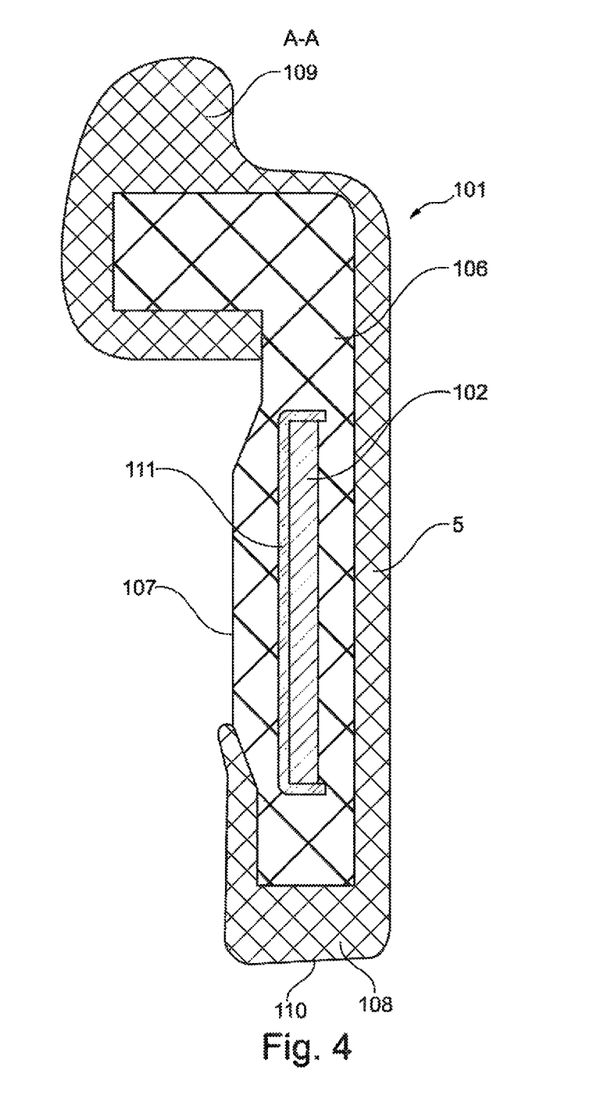
FIG. 4 shows a sectional view along line A-A of a second exemplary embodiment of a sealing element according to the invention.

FIG. 4 shows a second exemplary embodiment of a sealing element 101, the view of which corresponds to the top view of the first exemplary embodiment illustrated in FIG. 1. The sectional line illustrated in FIG. 4 is also made to extend, like the line A-A illustrated in FIG. 1, through an IC identifier 102, in the same way as the section line B-B in FIG. 5 penetrates an antenna 103 in a way which is analogous to the sectional line B-B in FIG. 1. A support element 106 with a section 107 has a comparable cross-sectional shape to that of the support element 6 from FIG. 2 or 3. Likewise, a sealing means 108 with a sealing lip 109 and a sealing section 110 has a cross-sectional shape which is already shown in FIG. 2 and FIG. 3.

A dielectric coating 111, which is embodied as a film, is additionally arranged on the antenna 103. The dielectric coating 111 is composed of a ceramic with a high dielectric constant which is significantly higher than that of plastics. The dielectric coating 111 is arranged on a side which points inward, toward the space enclosed by the sealing element 101 between the two bearing rings of the rolling contact bearing, and on the two sides of the IC identifier 102 which are short in cross-section, and said dielectric coating 111 protrudes to a certain degree beyond the two short sides of the IC identifier 102, with the result that the film of the dielectric coating 111 projects to a certain extent into the volume of the support element 106, which is manufactured from thermoplastic, as a result of which the IC identifier 102 is additionally attached to the support element 106 by means of the dielectric coating 111.

Figure 5:
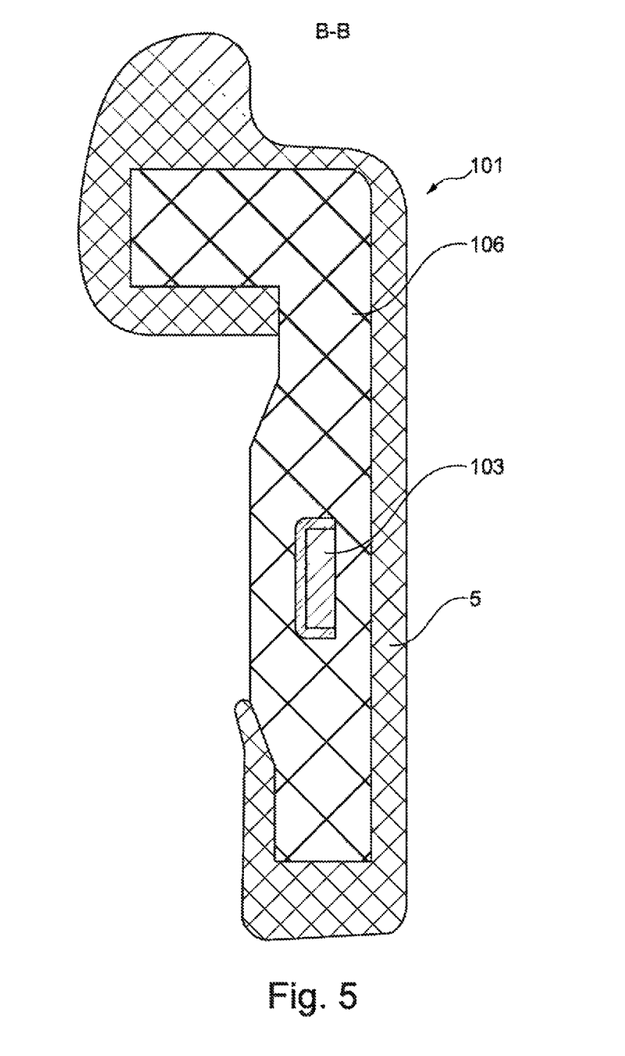
FIG. 5 shows a sectional view along line B-B of the second exemplary embodiment from FIG. 4.

FIG. 5 shows the sealing element 101 in the region of an antenna 103, on the side thereof which points inward to the interior of the space enclosed by the sealing element 101, and on the short sides of said antenna 103 the dielectric coating 111, which is in turn embodied as a dielectric film of a ceramic, extends. The film of the dielectric coating 111 is flush with the fourth side of the antenna 103 which is not covered by the film.

In the two exemplary embodiments described above, the sealing elements 1, 101 had each been manufactured according to the two-component injection molding method. In this process, a unit which is formed from the IC identifier 2, 102 and the antenna 3, 103 was first placed in a suitable mold, and a thermoplast was introduced into this mold and allowed to harden. In the second exemplary embodiment, before the introduction of the thermoplastic the film of the dielectric coating 111 had also been attached to the IC identifier 102 and the antenna 103, respectively, in such a way that it surrounded the two components on three sides. The IC identifier 2, 102 and the antenna 3, 103 were each arranged inside the support element 6, 106 by enclosure by injection molding with the thermoplastic. After the thermoplastic had hardened, the respective sealing means 8, 108 was injection molded onto the thermoplastic in a second method step, with the section 7, 107 being omitted.

As a result, the IC identifier 2, 102 and the antenna 3, 103 are arranged inside the support element 6, 106 and therefore do not take up any additional installation space. At the same time, the IC identifier 2, 102 and the antenna 3, 103 are arranged in such a way that they are mechanically protected and electrically insulated by the thermoplastics which completely surround them, in particular, the antenna 3, 103 is in a dielectric environment, wherein no metal, but rather a non-conductive material is arranged in the region of the support element 6, 106.

The spatially closest metallic object is a bearing cage (not illustrated) in the interior of the bearing, wherein the metal of the bearing cage causes the field strength of the electromagnetic field in the direct vicinity of the metal to become very low, with the result that only a low field strength is produced at the location of the antenna 3, 103. In the second exemplary embodiment, the dielectric coating 111 is provided between the antenna 103 and the interior of the bearing where the bearing cage is located, due to which dielectric coating 111 the wavelength of the electromagnetic radiation in the vicinity of the metallic bearing cage is reduced in the region of the dielectric coating 111, with the result that a high field strength can be set at the location of the antenna 103 adjacent to the dielectric coating 111. In this context, the thickness of the dielectric coating 111, the geometric shape thereof and the dielectric constant of the dielectric can be suitably adapted.

In the exemplary embodiments described above, the IC identifiers 2, 102 and the antennas 3, 103 were each arranged completely inside the support elements 6, 106. It goes without saying that the IC identifiers and/or the antennas can also be arranged on the outside of the sealing elements 1, 101 or on the outside of the support elements 6, 106, in such a way that they are still covered by the sealing means 8, 108.

LIST OF REFERENCE NUMERALS 1, 101 Sealing element
2, 102 IC identifier
3, 103 Antenna
4 Gap of 3
5 Body of 1
6, 106 Support element
7, 107 Section of 6
8, 108 Sealing means
9, 109 Sealing lip
10, 110 Sealing section
111 Dielectric coating

The invention claimed is:

1. A sealing element for a bearing, comprising:
  a body formed of a non-metallic support element and a sealing means surrounding the non-metallic support element except for a section;
  an IC identifier at least partially within the non-metallic support element and the sealing means;
  an antenna at least partially within the non-metallic support element and the sealing means; and,
  a dielectric coating arranged between:
    the IC identifier and the section of the non-metallic support element; and,
    the antenna and the section of the non-metallic support element.

2. The sealing element for a bearing recited in claim 1, wherein the sealing means is composed of an elastic material.

3. The sealing element for a bearing recited in claim 1, wherein the non-metallic support element is composed of a rigid material.

4. The sealing element for a bearing recited in claim 1, wherein the non-metallic support element includes a first dielectric constant and the dielectric coating includes a second dielectric constant where the second dielectric constant is higher than the first dielectric constant.

5. The sealing element for a bearing recited in claim 1, wherein the dielectric coating is arranged between the antenna and an interior space of the bearing.

6. The sealing element for a bearing recited in claim 1, wherein the dielectric coating is a ceramic.

7. The sealing element for a bearing recited in claim 1, wherein the antenna is a discontinuous annulus with a gap.

8. The sealing element for a bearing recited in claim 1, wherein the antenna is arranged completely inside the non-metallic support element.

9. The sealing element for a bearing recited in claim 1, wherein the IC identifier is arranged completely inside the non-metallic support element.

10. The sealing element for a bearing recited in claim 1, wherein the IC identifier is attached to the non-metallic support element.

11. A sealing element for a bearing, comprising:
  an annular body formed of a non-metallic support element and a sealing means surrounding the non-metallic support element except for a section, the annular body defining a space;
  an IC identifier at least partially within the non-metallic support element and the sealing means;
  an antenna at least partially within the non-metallic support element and the sealing means; and,
  a dielectric coating arranged on:
    the IC identifier and facing the section and the space; and,
    the antenna and facing the section and the space.

12. The sealing element for a bearing recited in claim 11, wherein the dielectric coating is a ceramic film.

13. The sealing element for a bearing recited in claim 11, wherein the antenna is arranged completely inside the non-metallic support element.

14. The sealing element for a bearing recited in claim 11, wherein the IC identifier is arranged completely inside the non-metallic support element.

15. The sealing element for a bearing recited in claim 11, wherein the non-metallic support element is made from plastic.

16. The sealing element for a bearing recited in claim 11, wherein the IC identifier is attached to the non-metallic support element.

17. The sealing element for a bearing recited in claim 11, wherein the non-metallic support element is made of a material having a first dielectric constant and the dielectric coating is made of a material having a second dielectric constant where the second dielectric constant is higher than the first dielectric constant.

18. The sealing element for a bearing recited in claim 11, wherein the antenna is a discontinuous annulus with a gap.

* * * * *